J. M. VAN HEUSEN.
SHIRT.
APPLICATION FILED DEC. 27, 1917.
1,352,704.
Patented Sept. 14, 1920.
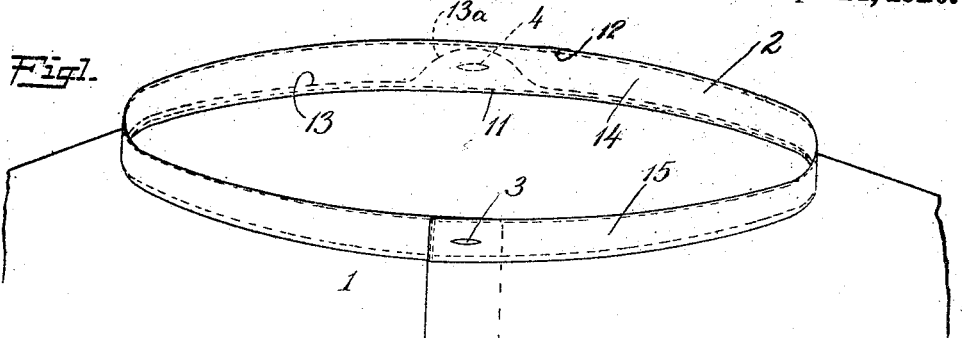
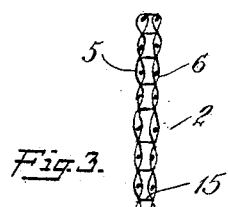
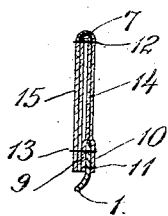
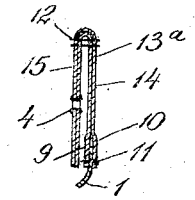
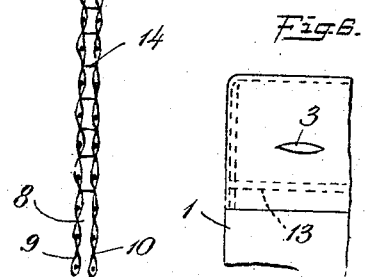
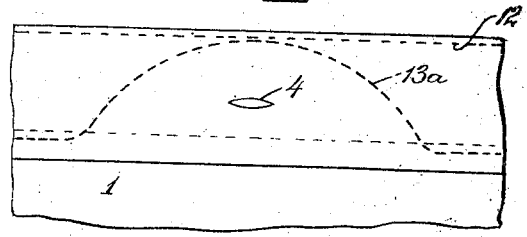
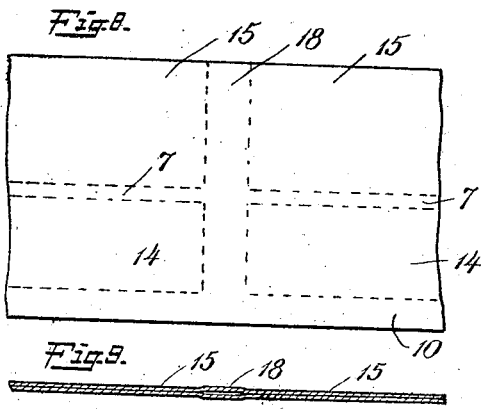
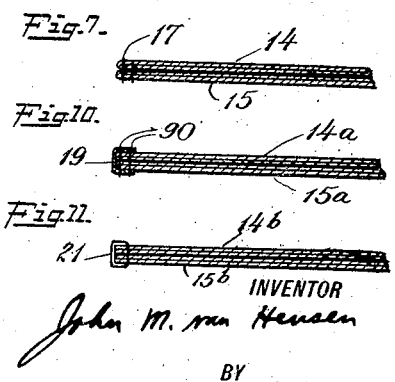
INVENTOR
John M. van Heusen
BY
Pennie Davis Marvin & Edmonds
ATTORNEYS

UNITED STATES PATENT OFFICE.

JOHN MANNING VAN HEUSEN, OF JAMAICA PLAIN, MASSACHUSETTS.

SHIRT.

1,352,704.

Specification of Letters Patent. Patented Sept. 14, 1920.

Application filed December 27, 1917. Serial No. 209,032.

*To all whom it may concern:*

Be it known that I, JOHN MANNING VAN HEUSEN, a citizen of the United States, residing at Jamaica Plain, in the county of Suffolk, State of Massachusetts, have invented certain new and useful Improvements in Shirts; and I do hereby declare the following to be a full, clear, and exact description of the invention, such as will enable others skilled in the art to which it appertains to make and use the same.

This invention relates to improvements in collar bands or neck bands of shirts, which neck bands or collar bands are made of multiple ply interwoven fabric, or of a single heavy fabric provided with a thin edge or divided edge by which it is secured to the shirt.

According to the present invention, the collar band or neck band is preferably and advantageously made of a two-ply interwoven fabric, but it may be made of a heavy fabric which is so woven as to present a divided edge, or a single thin edge, for attachment to the shirt.

The neck band or collar band of the present invention, when applied to the shirt, may be considered as a folded or turned down band, which is preferably stitched in its folded down position except at the back where the back button-hole is made therein.

The invention will be described more in detail in connection with the embodiments thereof illustrated in the accompanying drawings, in which:

Figure 1 illustrates the neck-band or collar band as applied to a shirt;

Fig. 2 is an enlarged sectional view of one form of collar band applied to the shirt;

Fig. 3 is a still further enlarged and exaggerated diagrammatic sectional view of the band in its unfolded and unattached state;

Fig. 4 is a back view of the back of the neck band of Fig. 1;

Fig. 5 is a sectional view of the band of Fig. 4, taken through the back button-hole;

Fig. 6 is an enlarged view of one end of the band;

Fig. 7 is a horizontal sectional view of the end of the band of Fig. 6;

Fig. 8 shows a piece of fabric from which the band may be formed;

Fig. 9 is a sectional view of the fabric of Fig. 8; and

Figs. 10 and 11 are sectional views similar to that of Fig. 7 showing modified bindings for the ends of the bands.

According to the present invention, the neck band, in its preferred embodiment, is made of a single continuous fabric woven of proper width, so that it will have selvaged edges, and require no added binding at its edges. The fabric is woven of a width approximately double the width of the neck band in its final form, and the fabric is preferably woven with a divided edge for securing the shirt thereto and therebetween. The fabric is preferably a heavy fabric of sufficient stiffness and rigidity so that, when folded and formed into the final neck band, it will have the proper form and shape and stiffness.

In order that the fabric may more readily fold at the desired fold line for forming the neck band, it may be woven with a portion of increased flexibility at this fold line. The fabric may be woven, moreover, either in straight lengths or of curvilinear contour so that, when folded, it will have the desired form and curvilinear shape or set which is desired in the completed shirt band.

Referring more particularly to the embodiments of the invention illustrated in the drawing, it will be seen that the shirt 1 is provided with the neck band or collar band 2 having therein the usual front and back button-holes 3 and 4. By reference to Fig. 3 it will be seen that the fabric therein illustrated, in a somewhat exaggerated manner, is a two-ply interwoven fabric made up of the plies 5 and 6 which are interwoven throughout the greater portion of width of the fabric; but that the interweaving is omitted at a central portion 7 and at the edge of the fabric, to leave single ply extensions 9 and 10, without interweaving, as indicated at 8. The divided edge formed by the single ply extensions 9 and 10 enables the shirt to be secured therebetween by one or more rows of stitches 11, as indicated in Figs. 2, 4 and 5.

The intermediate portion of the fabric indicated at 7, where the interweaving is omitted, is a portion of increased flexibility so that the fabric will more readily fold along this line. The fabric can then be folded in the manner indicated in Figs. 2 and 5 and, if desired, one or more rows of stitches 12 added to hold the two portions of the fabric together and add stiffness thereto. The inner portion of the neck band is shown at 14 and the outer or folded over portion at 15. These two portions can be further secured together at their lower edges, as at 13, by one or more rows of stitches. In order that the button-hole may be made in the outer turn-down portion of the neck band, as indicated at 4 in Figs. 1 and 4, the row of stitches 13 may be changed at the back of the neck band as indicated at 13ᵃ in Figs. 1, 4 and 5, thereby providing for the insertion of the collar button through the button-hole.

With the arrangement illustrated in Figs. 1 to 5, where the fabric is woven with selvage edges, no binding or infolding of the edges will be necessary. The ends of the bands will, however, require a special binding or finish, where these ends are cut. Various ways of finishing these ends are illustrated in Figs. 6, 7, 10 and 11. The arrangement of Figs. 6 and 7 can be made from a fabric such as illustrated in Fig. 8. This fabric is made up of the portions 14 and 15 corresponding to the portions 14 and 15 of Figs. 2 and 5, but portions 18 of the fabric have the inter weaving omitted so that single plies are there formed. The lengths of the portions 14 and 15 correspond to the lengths of the neck band so that the ends of the neck bands can be made from the separate plies at 18. By folding in one of these plies, and cutting off the other, as indicated in Fig. 7, and then stitching the infolds, the ends of the bands will be completed.

Where the special weave of Fig. 8 is not used, the interweaving of the fabric may be continuous and the ends of the band otherwise bound as indicated, for example, in Figs. 10 and 11. In the arrangement of Fig. 10, a tape 19 is applied to the ends of the band and stitched thereto by one or more rows of stitches 90. In the arrangement of Fig. 11, the ends of the bands are bound by button-hole stitching 21. The inner and outer portions of the bands of Figs. 10 and 11 are indicated respectively at 14ᵃ, 14ᵇ and 15ᵃ, 15ᵇ.

It will be evident that, where the fabric is a two-ply fabric, or other multiple ply interwoven fabric, the different plies may be made of different materials, so that a more attractive or expensive material may be used for the outer portion of the band than for the inner portions.

It will be evident also, that various modifications can be made in the weave of the fabric from which the neck band is made while still retaining the advantages characteristic of the invention.

Having thus described my invention, what I claim is:

1. A shirt provided with a collar band made of a single width of fabric folded at an intermediate portion to form the upper edge, the inner portion and the outer portion of the band, one of the said portions having a divided edge between which the shirt is secured.

2. A shirt provided with a single fold collar band, the inner portion thereof provided with a divided edge between which the fabric of the shirt is secured and having the inner and outer portions secured together at their lower edges except near the back button hole.

3. A shirt provided with a folded collar band of multiple ply interwoven fabric having one or more plies thereof extended from the main portion of the band and having the shirt secured to the band by such extensions.

4. A shirt provided with a multiple ply interwoven collar band which is folded at the upper edge of the band and which has a fold line of increased flexibility woven therein.

5. A shirt provided with a collar band of heavy fabric comprising an upper edge, an inner portion and a folded over portion, one of the portions having a divided edge between which the shirt is secured and the inner and outer portions sewn along the lower edges except near the back button-hole.

6. A shirt provided with a collar band woven in one piece, comprising an inner portion, an intermediate edge fold portion and an outer portion, the outer portion being longer than the inner portion so that the collar band takes on a curvilinear set, one of said portions having a divided edge integral therewith between which the fabric of the shirt is secured and having the inner and outer portions secured together, except near the back button-hole.

7. A shirt provided with a collar band woven in one piece of multiple-ply, interwoven fabric, comprising an inner portion, an intermediate curvilinear weakened edge fold portion, the inner portion provided with a divided edge to which the shirt is secured.

8. A shirt provided with a collar band woven in one piece, comprising an inner portion, an intermediate curvilinear edge fold portion of increased flexibility, the outer portion being woven longer than the inner portion, said inner portion provided with a divided edge woven integral therewith between which the fabric of the shirt is secured.

In testimony whereof I affix my signature.

JOHN MANNING van HEUSEN.